US012667915B2

(12) United States Patent
Takahashi et al.

(10) Patent No.: US 12,667,915 B2
(45) Date of Patent: Jun. 30, 2026

(54) JOINED BODY AND MANUFACTURING METHOD FOR METAL MEMBER USED FOR SAME JOINED BODY

(71) Applicant: DENSO CORPORATION, Kariya-city (JP)

(72) Inventors: Yuya Takahashi, Kariya-city (JP);
Fumio Kawanishi, Kariya-city (JP);
Tsuyoshi Hayakawa, Kariya-city (JP);
Tomohiko Takenaka, Kariya-city (JP);
Kazuki Koda, Kariya-city (JP);
Hideaki Shirai, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 202 days.

(21) Appl. No.: 18/442,849

(22) Filed: Feb. 15, 2024

(65) Prior Publication Data

US 2024/0181566 A1     Jun. 6, 2024

Related U.S. Application Data

(63) Continuation of application No. PCT/JP2022/027608, filed on Jul. 13, 2022.

(30) Foreign Application Priority Data

Aug. 17, 2021   (JP) ................................. 2021-132788

(51) Int. Cl.
*B23K 26/21*       (2014.01)
*B32B 3/30*        (2006.01)
(Continued)

(52) U.S. Cl.
CPC ................ *B23K 26/21* (2015.10); *B32B 3/30* (2013.01); *B32B 5/18* (2013.01); *B32B 15/046* (2013.01); *B32B 15/08* (2013.01)

(58) Field of Classification Search
CPC .. B23K 26/21; B32B 3/30; B32B 5/18; B32B 15/046; B32B 15/08
(Continued)

(56) References Cited

U.S. PATENT DOCUMENTS

2013/0078423 A1* 3/2013 Sutou ................ B29C 45/14311
                                                             428/141
2014/0305914 A1* 10/2014 Sutou ................ B29C 45/14778
                                                             219/121.17
(Continued)

FOREIGN PATENT DOCUMENTS

JP       2013071312 A     4/2013
JP       2015142943 A     8/2015
(Continued)

*Primary Examiner* — Tahseen Khan
(74) *Attorney, Agent, or Firm* — Harness, Dickey & Pierce, PLC

(57)        ABSTRACT

This joined body includes a metal member having a joining surface with depressions formed therein and a resin member that is joined to the metal member at the joining surface. The joined body includes an intersecting-direction uneven section and a cover section. The intersecting-direction uneven section is included in a depressed surface formation section that forms a depressed surface of the metal member that faces the depressions. The intersecting-direction uneven section is uneven in a direction intersecting a depth direction of the depression. The cover section forms a surface layer of the depressed surface formation section and covers the intersecting-direction uneven section. The cover section forms a thinner layer than an uneven depth of the intersecting-direction uneven section, and has a porous structure which is filled with the resin member.

8 Claims, 6 Drawing Sheets

(51) Int. Cl.
 _B32B 5/18_ (2006.01)
 _B32B 15/04_ (2006.01)
 _B32B 15/08_ (2006.01)

(58) Field of Classification Search
 USPC ........................................................ 428/159
 See application file for complete search history.

(56) References Cited

U.S. PATENT DOCUMENTS

| | | | |
|---|---|---|---|
| 2016/0046050 A1 | 2/2016 | Ikeda et al. | |
| 2019/0206761 A1 | 7/2019 | Nomura et al. | |
| 2019/0232617 A1 | 8/2019 | Ishikawa et al. | |
| 2022/0088521 A1* | 3/2022 | Kayama | C04B 38/0006 |
| 2023/0302764 A1* | 9/2023 | Taguchi | B32B 5/18 |

FOREIGN PATENT DOCUMENTS

| | | | |
|---|---|---|---|
| JP | 2016132131 A | 7/2016 |
| JP | 2018066677 A | 4/2018 |
| JP | 2018080360 A | 5/2018 |
| JP | 2020001313 A | 1/2020 |
| WO | WO-2019131046 A1 | 7/2019 |

\* cited by examiner

FIG.8

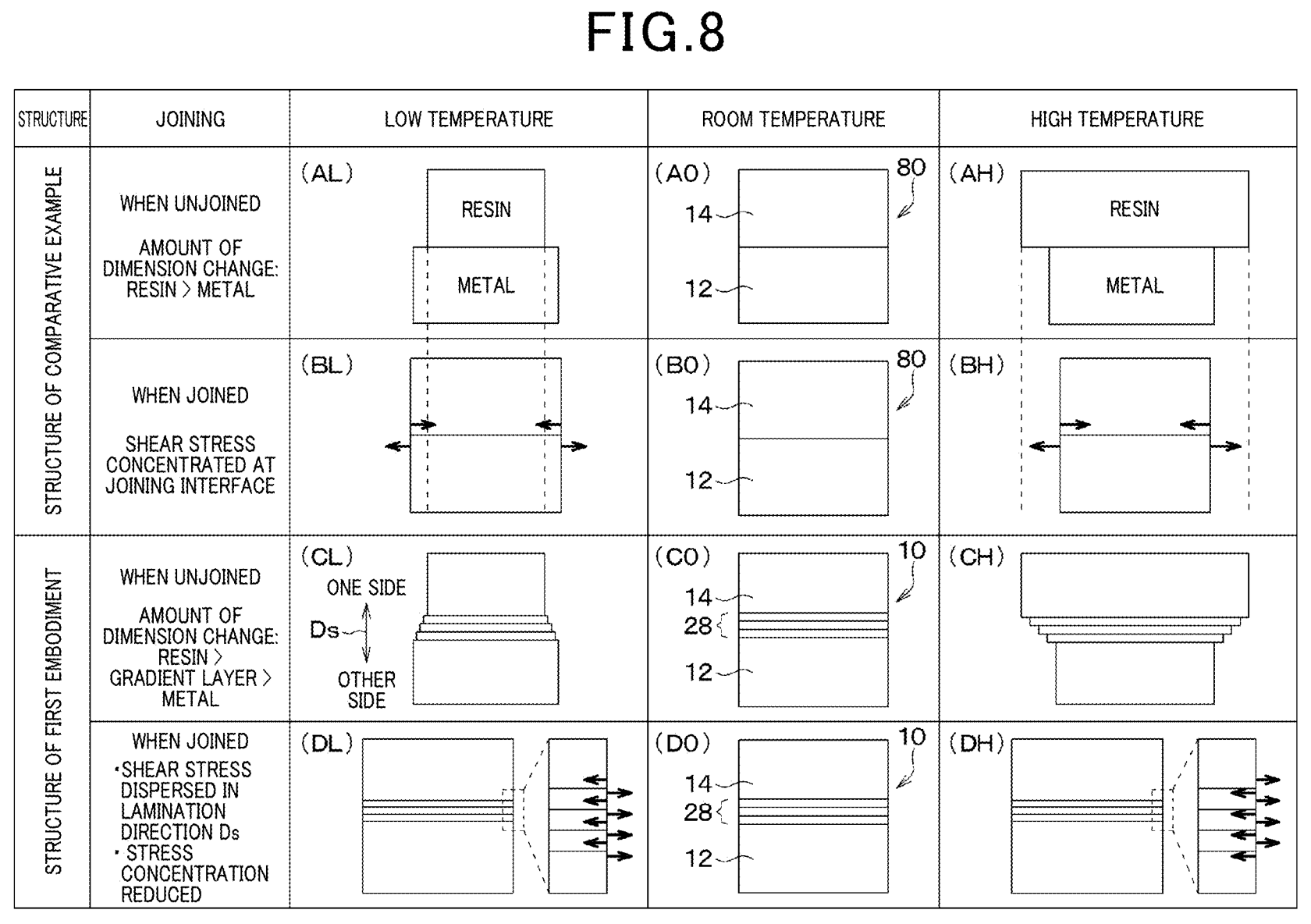

| STRUCTURE | JOINING | LOW TEMPERATURE | ROOM TEMPERATURE | HIGH TEMPERATURE |
|---|---|---|---|---|
| STRUCTURE OF COMPARATIVE EXAMPLE | WHEN UNJOINED<br><br>AMOUNT OF DIMENSION CHANGE: RESIN > METAL | (AL)<br>RESIN<br>METAL | (AO)<br>80<br>14<br>12 | (AH)<br>RESIN<br>METAL |
| | WHEN JOINED<br><br>SHEAR STRESS CONCENTRATED AT JOINING INTERFACE | (BL) | (BO)<br>80<br>14<br>12 | (BH)<br>METAL |
| STRUCTURE OF FIRST EMBODIMENT | WHEN UNJOINED<br><br>AMOUNT OF DIMENSION CHANGE: RESIN > GRADIENT LAYER > METAL | (CL)<br>ONE SIDE  Ds  OTHER SIDE | (CO)<br>10<br>14<br>28<br>12 | (CH) |
| | WHEN JOINED<br><br>·SHEAR STRESS DISPERSED IN LAMINATION DIRECTION Ds<br>·STRESS CONCENTRATION REDUCED | (DL) | (DO)<br>10<br>14<br>28<br>12 | (DH) |

JOINED BODY AND MANUFACTURING METHOD FOR METAL MEMBER USED FOR SAME JOINED BODY

CROSS-REFERENCE TO RELATED APPLICATION

The present application is based on and claims the benefit of priority from earlier Japanese Patent Application No. 2021-132788 filed on Aug. 17, 2021, the description of which is incorporated herein by reference.

BACKGROUND

Technical Field

The present disclosure relates to a joined body having a metal member and a resin member, and a manufacturing method for a metal member used for the same joined body.

Related Art

As one type of such a joined body, for example, a resin-metal joined body is conventionally known. The resin-metal joined body is a joined body in which a synthetic resin member is joined to a metal surface.

SUMMARY

According to one aspect of the present disclosure, a joined body includes a metal member having a joining surface with a depression formed therein, and a resin member that is joined to the metal member at the joining surface, the joined body including: an intersecting-direction uneven section that is included in a depressed surface formation section that forms a depressed surface of the metal member that faces the depression, and that is uneven in a direction intersecting a depth direction of the depression; and a cover section that forms a surface layer of the depressed surface formation section, and covers the intersecting-direction uneven section, wherein the cover section forms a thinner layer than an uneven depth of the intersecting-direction uneven section, and has a porous structure, and the porous structure of the cover section is filled with the resin member.

BRIEF DESCRIPTION OF THE DRAWINGS

In the accompanying drawings:

FIG. 8 is a diagram comparing the joined body of the first embodiment and a joined body of a Comparative Example in order to describe the operational effects exhibited by the joined body of the first embodiment.

DETAILED DESCRIPTION OF THE PREFERRED EMBODIMENTS

Figure 1:
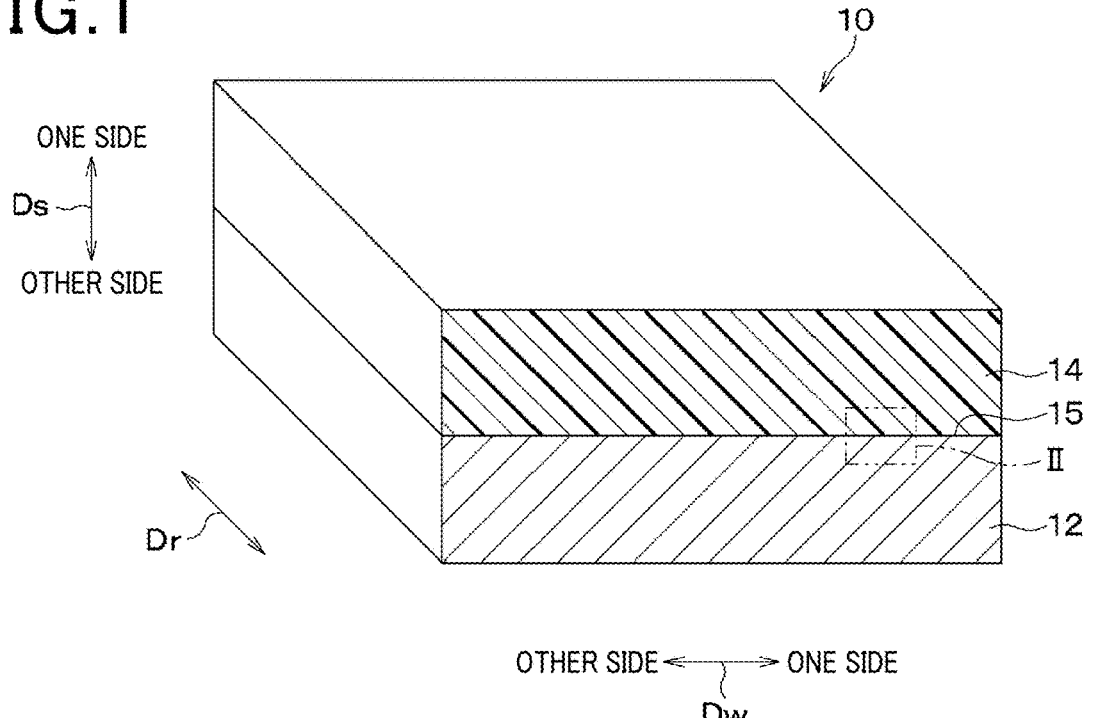
FIG. 1 is a perspective view schematically illustrating a joined body in which a metal member and a resin member are joined to each other according to a first embodiment.

As one type of such a joined body, for example, the resin-metal joined body described in JP 2018-66677 A is conventionally known. The resin-metal joined body described in JP 2018-66677 A is a joined body in which a synthetic resin member is joined to a metal surface.

In the resin-metal joined body described in JP 2018-66677 A, a plurality of micro-concave sections, which are concave sections having a micron order depth, are formed on the metal surface. Furthermore, a plurality of nano-irregularities, being unevenness having a sub-micron order or nano-order height or depth, are formed on the metal surface.

When a joined body in which a metal member and a resin member are joined is placed in an environment with severe temperature changes, such as an on-board environment, thermal stress occurs at the joining interface due to a difference in linear expansion coefficient between the metal material and the resin material. Therefore, there is a concern that the resin member may become detached from the joining surface of the metal member in an environment with severe temperature changes.

In contrast, in the resin-metal joined body of JP 2018-66677 A, a plurality of micro-concave sections and nano-irregularities are formed on the metal surface that serves as the joining surface to which the resin member is joined, which results in an increase in the joining strength between the metal member and the resin member. However, the resin-metal joined body of JP 2018-66677 A did not have sufficient durability in terms of preventing detachment of the resin member caused by the thermal stress described above. The inventors have found the above as a result of detailed investigation.

In view of the above points, the present disclosure has an object of providing a joined body having a metal member and a resin member, which is a joined body capable of preventing the resin member from being detached from the metal member, even when placed in an environment with severe temperature changes.

Embodiments will be described below with reference to the drawings. Note that the same or equivalent parts throughout the following embodiments, including the other embodiments described later, share the same reference signs in the drawings.

First Embodiment

As illustrating in FIG. 1, the joined body 10 of the present embodiment is configured by a metal member 12 and a resin member 14. In the joined body 10, the resin member 14 is laminated with respect to the metal member 12 on one side in a lamination direction Ds. Further, the resin member 14 is joined to the metal member 12 at a joining surface 15, which is a surface of the metal member 12 on one side in the lamination direction Ds. The joining surface 15 is a surface belonging to the metal member 12 that constitutes a joining interface between the metal member 12 and the resin member 14.

Figure 2:
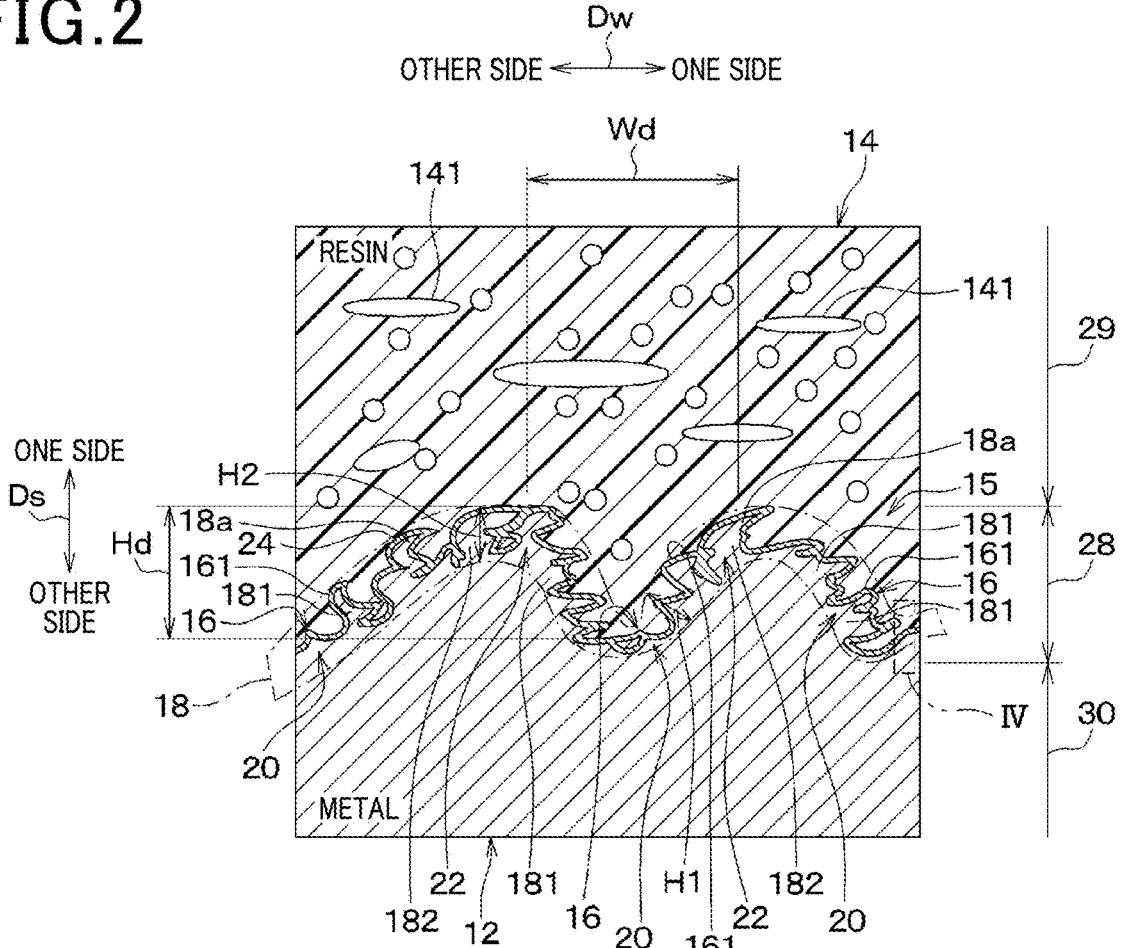
FIG. 2 is a schematic diagram illustrating an enlarged cross-section of a joining interface between the metal member and the resin member included in the joined body and is a cross-sectional view illustrating an enlarged section II of FIG. 1 according to the first embodiment.

In the present embodiment, the base metal of the metal member 12 is aluminum alloy, and the resin member 14 is made of PBT. Note that the resin member 14 does not have to include a glass filler 141, but as shown in FIG. 2, a glass filler 141 is included in the present embodiment. Furthermore, PBT is an abbreviation for polybutylene terephthalate resin.

As illustrated in FIG. 2, the joining surface 15 of the metal member 12 is formed having a plurality of fine grooves 16. Therefore, when viewed microscopically, the joining surface 15 has a thickness in the lamination direction Ds.

Figure 3:
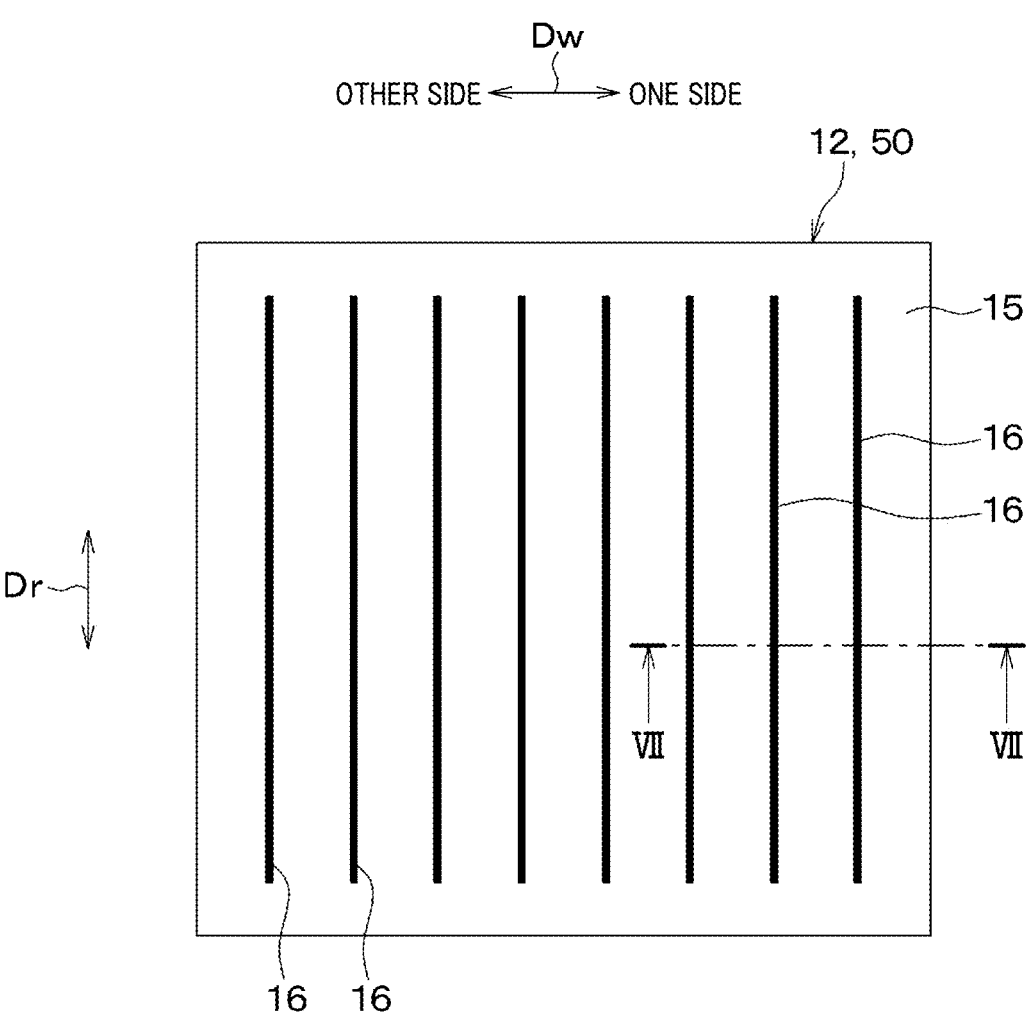
FIG. 3 is a plan view schematically illustrating, as an excerpt, the metal member included in the joined body and is a diagram illustrating a joining surface of the metal member according to the first embodiment.

Since the plurality of grooves 16 that are provided in the joining surface 15 are depressed from one side toward the other side in the lamination direction Ds, the lamination direction Ds also represents, in other words, the depth direction of the grooves 16. As illustrated in FIG. 3, the plurality of grooves 16 each extend in a groove extension direction Dr along the joining surface 15. Furthermore, the plurality of grooves 16 are provided side by side from one side toward the other side in a groove arrangement direction Dw. The aspect ratio of the grooves 16, which is the ratio of the groove depth Hd to the groove width Wd, is preferably 1 or less. The aspect ratio of the grooves 16 is calculated by the formula "aspect ratio=Hd/Wd".

In the present embodiment, the groove extension direction Dr, the groove arrangement direction Dw, and the lamination direction Ds are directions that intersect each other, and strictly speaking, are directions that are perpendicular to each other. Furthermore, the groove arrangement direction Dw corresponds to one direction in the present disclosure.

As illustrated in FIG. 2, the metal member 12 has a joining uneven section 18 provided on the joining surface 15 and formed having an uneven shape, and the joining uneven section 18 is formed across the entire joining interface between the metal member 12 and the resin member 14. Therefore, the uneven shape of the joining uneven section 18 is formed on a groove surface formation section 20 of the metal member 12, which forms a groove surface 161 that faces the grooves 16, and an inter-groove section 22 of the metal member 12, which forms the joining surface 15 between each of the plurality of grooves 16. In short, the uneven shape of the joining uneven section 18 extends to the groove surface 161 of each of the plurality of grooves 16 and between each of the plurality of grooves 16.

That is, the joining uneven section 18 includes an intersecting-direction uneven section 181 that forms the uneven shape included in the groove surface formation section 20, and an inter-groove uneven section 182 that forms the uneven shape included in the inter-groove section 22. Further, the intersecting-direction uneven section 181 forms a shape that is uneven in a direction that intersects the lamination direction Ds, and of the entire groove surface 161 is also provided, for example, on the groove side surface and the groove bottom surface.

Moreover, the metal member 12 has a cover section 24 provided on the joining surface 15, and the cover section 24 covers the entire joining uneven section 18. Therefore, in the groove surface formation section 20, the cover section 24 forms a surface layer of the groove surface formation section 20, and covers the intersecting-direction uneven section 181. In addition, the cover section 24 is provided so as to extend from the groove surface formation section 20 to the inter-groove section 22, and also forms the surface layer of the inter-groove section 22. That is, in the inter-groove section 22, the cover section 24 covers the inter-groove uneven section 182.

Furthermore, the cover section 24 forms a thinner layer than the uneven depths H1 and H2 of the joining uneven section 18. That is, the cover section 24 forms a thinner layer than the uneven depth H1 of the intersecting-direction uneven section 181 in the groove surface formation section 20, and forms a thinner layer than the uneven depth H2 of the inter-groove uneven section 182 in the inter-groove section 22.

The uneven depths H1 and H2 of the joining uneven section 18 are, in other words, the thicknesses H1 and H2 of the joining uneven section 18, and in the present embodiment, for example, are 1 to 100 μm. Furthermore, the thickness of the cover section 24 is, for example, 10 nm to 10 μm. In this way, since the joining uneven section 18 has a μm-scale protrusion structure, and the cover section 24 has a nm-scale structure, when the entire joining surface 15 is viewed, the thickness of the cover section 24 is significantly smaller than the thicknesses H1 and H2 of the joining uneven section 18. Therefore, even when the thicknesses H1 and H2 of the joining uneven section 18 and the thickness of the cover section 24 are compared, for example, by their average values or their maximum values, there is no change in the fact that the cover section 24 forms a thinner layer than the thicknesses (in other words, the uneven depths) H1 and H2 of the joining uneven section 18. As a confirmation, the thicknesses H1 and H2 of the joining uneven section 18 do not include the thickness of the cover section 24.

Figure 4:
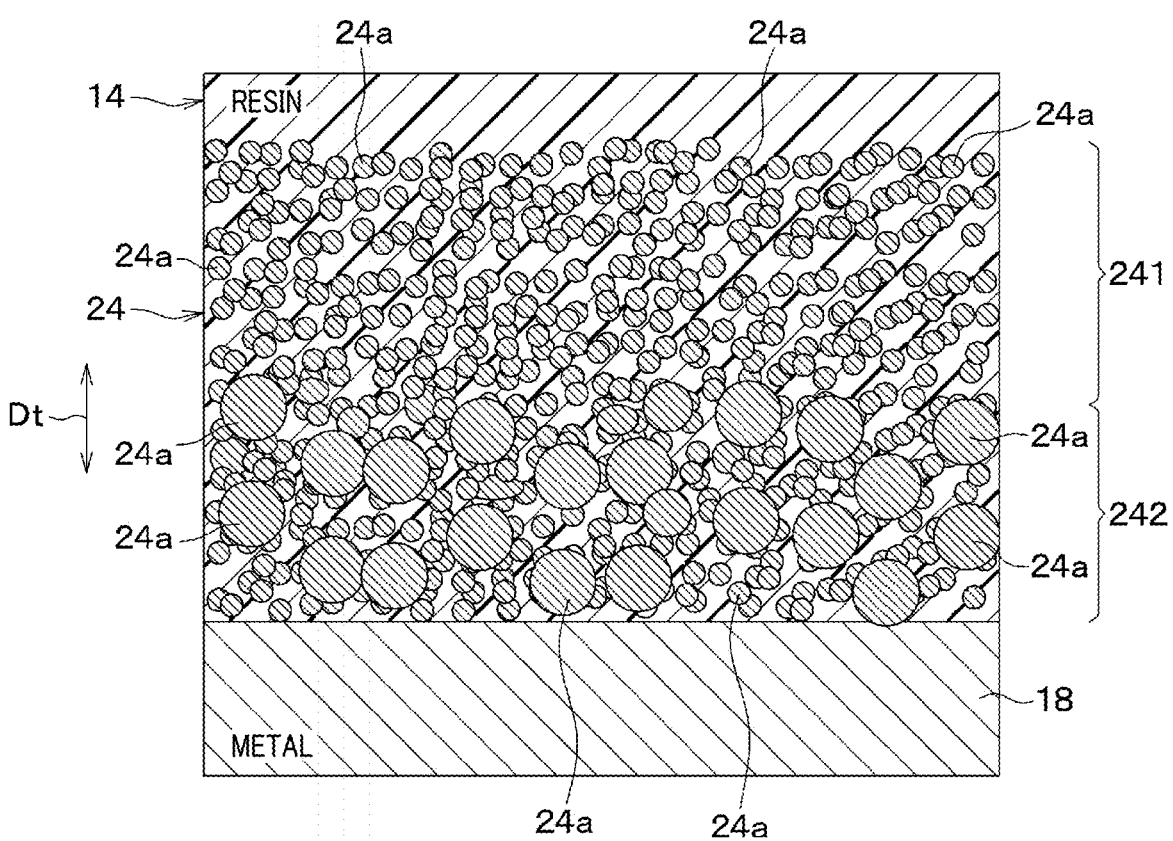
FIG. 4 is a schematic diagram illustrating an enlarged cover section of the metal member and is a cross-sectional view illustrating section IV of FIG. 2.

In addition, as illustrated in FIGS. 2 and 4, the cover section 24 has a structure in which a plurality of granules 24a that constitute a portion of the metal member 12 are joined together so as to form pores, that is, a porous structure in which a large number of fine voids are formed. The large number of fine voids of the porous structure are filled with the resin member 14. The plurality of granules 24a constituting the cover section 24 are not suspended in the resin member 14, but are each joined to the joining uneven section 18 directly, or via other granules 24a.

Furthermore, the cover section 24 has a first layer 241 and a second layer 242 that are laminated in a thickness direction Dt of the cover section 24. Since the cover section 24 has a porous structure that has been filled with the resin member 14 as described above, the first layer 241 and the second layer 242 also have a porous structure that has been filled with the resin member 14.

The second layer 242 of the cover section 24 is provided between the first layer 241 and the joining uneven section 18. That is, the second layer 242 is provided between the first layer 241 and the intersecting-direction uneven section 181 in the groove surface formation section 20, and between the first layer 241 and the inter-groove uneven section 182 in the inter-groove section 22.

Since the cover section 24 is constituted by a plurality of granules 24a, the first layer 241 and the second layer 242 are also constituted by a plurality of granules 24a. However, the particle size distribution of the granules 24a constituting the second layer 242 is biased toward a larger particle size compared to the particle size distribution of the granules 24a constituting the first layer 241.

Therefore, of the plurality of granules 24a included in the cover section 24, the second layer 242 includes granules 24a having a larger particle size than that of the granules 24a constituting the first layer 241. More specifically, the second layer 242 contains granules 24a whose particle size is even larger than that of the largest granules 24a constituting the first layer 241.

For example, the particle size of the granules 24a constituting the first layer 241 is 1 to 20 nm, and the particle size of the granules 24a constituting the second layer 242 is 10 to 200 nm. As the measurement method of the particle size of the granules 24a, various measurement methods can be used as long as the measurement method is the same for the measurement of the first layer 241 and the measurement of the second layer 242.

Furthermore, since the particle size of the granules 24a is different between the first layer 241 and the second layer 242, the content ratio of the metal material constituting the metal member 12 to the resin material constituting the resin member 14 is different between the first layer 241 and the second layer 242. Specifically, the content ratio is defined as "content ratio=mass of metal material/mass of resin material", and the content ratio of the first layer 241 is smaller than the content ratio of the second layer 242. In the description below, unless otherwise specified, the content ratio of the metal material to the resin material will be described using "content ratio=mass of metal material/mass of resin material".

As described above, the joining interface between the metal member 12 and the resin member 14 is provided with the plurality of grooves 16, the joining uneven section 18, and the cover section 24. Therefore, the joining interface is a gradient layer 28 in which the content ratio of the metal material to the resin material increases toward the other side in the lamination direction Ds.

Further, one side of the gradient layer 28 in the lamination direction Ds is a resin-constituted section 29 that contains the resin material but does not contain the metal material, and most of the resin member 14 is the resin-constituted section 29. On the other hand, the other side of the gradient layer 28 in the lamination direction Ds is a metal-constituted section 30 that contains the metal material but does not contain the resin material, and most of the metal member 12 is the metal-constituted section 30.

Note that, in the present embodiment, the grooves 16 correspond to the depressions of the present disclosure, the groove surface 161 corresponds to the depressed surface of the present disclosure, the groove surface formation section 20 corresponds to the depressed surface formation section of the present disclosure, the inter-groove section 22 corresponds to the inter-depression section of the present disclosure, and the inter-groove uneven section 182 corresponds to the inter-depression uneven section of the present disclosure.

Next, the manufacturing method of the metal member 12 provided in the joined body 10 will be described using FIG. 5. In the present embodiment, the joined body 10 is obtained by joining the resin member 14 to the metal member 12 obtained through the manufacturing process in FIG. 5. As the processing method of joining the resin member 14 to the metal member 12, for example, it is possible to use an arbitrary processing method such insert molding or thermocompression bonding.

Figure 5:
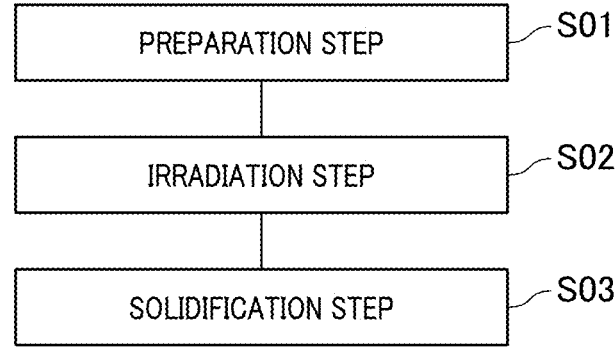
FIG. 5 is a flow chart illustrating a manufacturing process of the metal member included in the joined body according to the first embodiment.
Figure 6:
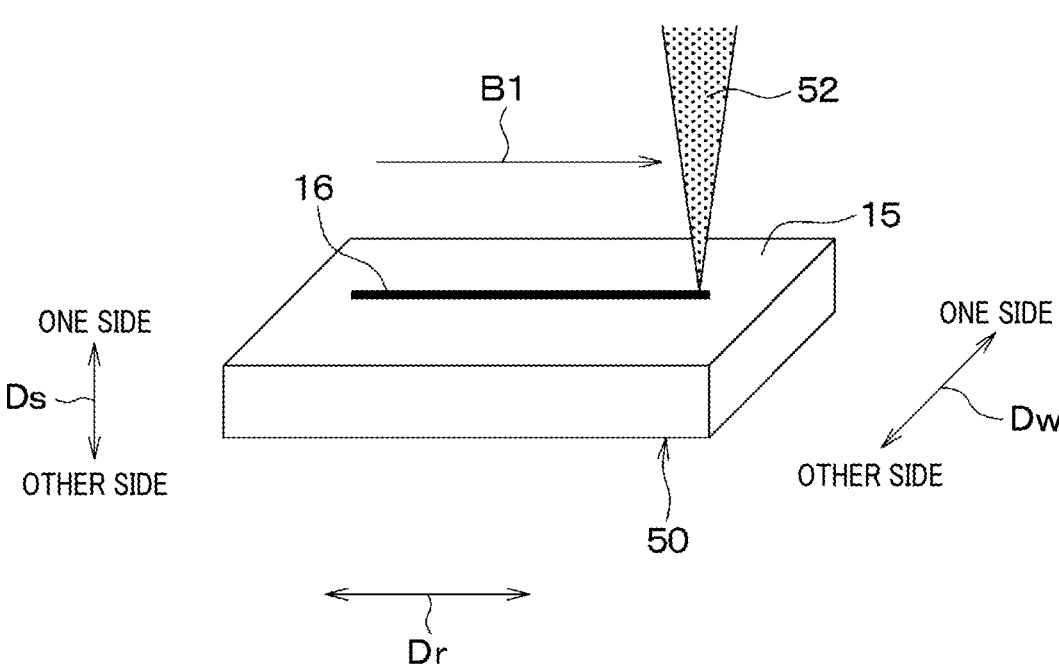
FIG. 6 is a diagram schematically illustrating the formation of a groove in the joining surface by irradiating a processed member with an energy beam in the second step in FIG. 5.

As illustrated in FIGS. 5 and 6, in first step S01, being a preparation step, a processed member 50 to be processed into the metal member 12 is prepared. In the first step S01, the joining surface 15 of the processed member 50 has not yet been processed to form the grooves 16, and for example, is a smooth surface.

In second step S02, being an irradiation step, an energy beam 52 is irradiated with respect to the joining surface 15 of the processed member 50 while scanning as indicated by the arrow B1 in FIG. 6. More specifically, in each process that forms a single groove 16, the energy beam 52 is scanned a single time instead of being scanned a plurality of times. As a result, the evaporated metal that has been evaporated and vaporized, and a portion of the molten metal that has been melted and liquefied are scattered, and the grooves 16 are also formed in the joining surface 15. As illustrated in FIG. 3, a plurality of grooves 16 are formed in the joining surface 15.

The energy beam 52 used in second step S02 of the present embodiment is, for example, an infrared laser beam, and is irradiated by nanosecond pulse oscillation. Furthermore, for example, the pulse width of the energy beam 52 is 10 ps to 10 ps, the power density is 104 to 107 W/mm$^2$, the irradiation diameter (in other words, the focusing diameter) on the joining surface 15 is 100 μm or more, and the output is 100 W or more.

In third step S03, being a solidification step in FIG. 5, the processed member 50 is cooled after being irradiated by the energy beam 52. For example, the processed member 50 is cooled as a result of being left to stand in the air.

As a result of cooling the processed member 50, the molten metal that has remained on the joining surface 15 without being scattered is solidified. Also, the scattered evaporated metal and the scattered molten metal attach to the joining surface 15 and are solidified.

Specifically, the molten metal that has remained on the joining surface 15 without being scattered rises up due to the evaporation pressure of the metal material, and is solidified in a state exhibiting an uneven shape. As a result, the joining uneven section 18 in FIG. 2 is provided on the joining surface 15 as a resulting product in which the molten metal is solidified in a state exhibiting an uneven shape. In other words, the joining uneven section 18 is formed including a melt solidified material exhibiting a state in which the base metal of the metal member 12 is not oxidized and is resolidified with the composition of the base metal.

Furthermore, in terms of the groove surface formation section 20 and the inter-groove section 22, as illustrated in FIG. 2, the intersecting-direction uneven section 181 is provided on the groove surface 161 of the metal member 12 in the groove surface formation section 20, and the inter-groove uneven section 182 is provided in the inter-groove section 22. The intersecting-direction uneven section 181 and the inter-groove uneven section 182 are also formed by including a melt solidified material.

In addition, as illustrated in FIGS. 2 and 4, as a result of the scattered evaporated metal and molten metal becoming attached and solidifying on the joining surface 15, the cover section 24 is provided on the joining surface 15 so as to cover the joining uneven section 18 as a resulting product in which the scattered evaporated metal and molten metal have been solidified. Further, the cover section 24 is formed as a thinner layer than the uneven depths H1 and H2 of the joining uneven section 18, and is formed having a structure in which the plurality of granules 24a are joined to each other so as to form pores (in short, a porous structure).

That is, in the groove surface formation section 20, the cover section 24 forms the surface layer of the groove surface formation section 20 and covers the intersecting-direction uneven section 181, and is formed as a thinner layer than the uneven depth H1 of the intersecting-direction uneven section 181. Further, in the inter-groove section 22, the cover section 24 forms the surface layer of the inter-groove section 22 and covers the inter-groove uneven section 182, and is formed as a thinner layer than the uneven depth H2 of the inter-groove uneven section 182.

At this time, the scattered evaporated metal and the scattered molten metal are respectively attached and solidified in a layer form on the joining surface 15. Specifically, the second layer 242 of the cover section 24 is formed as a result of the scattered molten metal reattaching and solidifying on the joining surface 15. Further, the first layer 241 of the cover section 24 is forms as a result of the scattered evaporated metal reattaching and solidifying on the joining surface 15.

In addition, since the scattered evaporated metal and molten metal are each oxidized while scattered, the cover section 24 is formed including a metal oxide in which the base metal of the metal member 12 has been oxidized. When the cover section 24 and the joining uneven section 18 are compared, the cover section 24 has a larger content ratio of the metal oxide to the melt solidified material compared to the joining uneven section 18.

Figure 7:
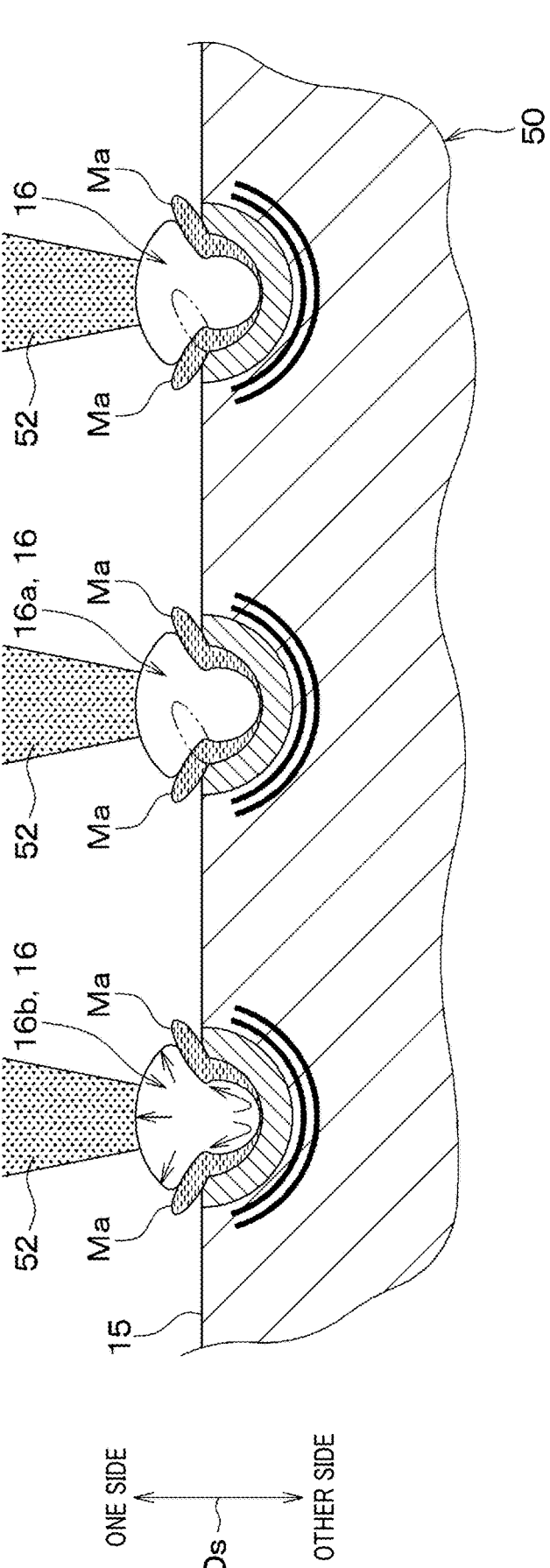
FIG. 7 is a cross-sectional view illustrating the cross-section VII-VII in FIG. 3 and is a schematic diagram for describing the shape of the molten metal that occurs when a plurality of grooves are formed in the joining surface in the second step in FIG. 5.

Here, a plurality of grooves 16 are formed in second step S02 in FIG. 5, and the grooves 16 are formed in turn by irradiating the energy beam 52 from one side toward the other side in the groove arrangement direction Dw. As a result, as illustrated in FIG. 7, a certain first groove 16*a* among the plurality of grooves 16 is affected by the processing of a second groove 16*b* that is adjacent to the first groove 16*a* on the other side in the groove arrangement direction Dw.

Specifically, during the processing of the first groove 16*a*, the molten metal Ma that has remained in the first groove 16*a* forms an uneven shape that expands to the outside of the first groove 16*a* due to the evaporation pressure of the metal material. That is, at this point, the molten metal Ma in the first groove 16*a* forms, on one side in the groove arrangement direction Dw with respect to the center of the first groove 16*a*, an uneven shape in which protruding ends 18*a* (see FIG. 2) are facing toward one side in the groove arrangement direction Dw. Further, on the other side in the groove arrangement direction Dw, the molten metal Ma forms an uneven shape in which protruding ends 18*a* are facing toward the other side in the groove arrangement direction Dw.

Then, in the processing of the second groove 16*b*, when the energy beam 52 is irradiated in the position of the second groove 16*b*, the evaporation pressure of the metal material and the processing heat at the second groove 16*b* reach the first groove 16*a*. As a result, the uneven shape of the first groove 16*a* is deformed so as to be pressed from the other side toward one side in the groove arrangement direction Dw as indicated by a two-dot chain line in FIG. 7.

Therefore, the joining uneven section 18 that has been solidified through third step S03 in FIG. 5 is formed such that, as shown in FIG. 2, the plurality of protruding ends 18*a* included in the uneven shape of the joining uneven section 18 are biased facing more toward one side than the other side in the groove arrangement direction Dw. In other words, the joining uneven section 18 is formed such that the plurality of protruding ends 18*a* included in the uneven shape of the joining uneven section 18 are formed such that the orientation is biased facing more toward one side in the groove arrangement direction Dw than facing the other side in the groove arrangement direction Dw.

Next, operational effects exhibited by the present embodiment will be described. According to the present embodiment, as illustrated in FIGS. 2 and 4, a plurality of grooves 16 are formed in the joining surface 15 of the metal member 12. The intersecting-direction uneven section 181 is included in the groove surface formation section 20, and the cover section 24 forms the surface layer of the groove surface formation section 20 and covers the intersecting-direction uneven section 181. The cover section 24 forms a thinner layer than the uneven depth H1 of the intersecting-direction uneven section 181, and has a porous structure. Further, the porous structure of the cover section 24 is filled by the resin member 14.

As a result of such a configuration, by providing the plurality of grooves 16 formed in the joining surface 15, the intersecting-direction uneven section 181, and the cover section 24, the joining interface between the metal member 12 and the resin member 14 has a structure in which the composition ratio between the metal material and the resin material changes gradually in the lamination direction Ds. In short, in the present embodiment, the joining interface between the metal member 12 and the resin member 14 is a gradient layer 28 in which the content ratio of the metal material to the resin material increases toward the other side in the lamination direction Ds. Consequently, the thermal stress generated at the joining interface between the metal member 12 and the resin member 14 is reduced.

Therefore, even when the joined body 10 is placed in an environment with severe temperature changes, such as an on-board environment, it is possible to prevent the resin member 14 from being detached from the metal member 12. Further, sufficient cold and heat durability, high adhesion strength, and sealing properties that maintain the joining between the metal member 12 and the resin member 14 can be ensured.

Here, as illustrated in FIG. 8, the joined body 10 of the present embodiment and a joined body 80 of a Comparative Example, in which the joining interface is not a gradient layer 28, will be compared. For example, assuming that the metal member 12 and the resin member 14 are not joined in the joined body 80 of the Comparative Example, when a temperature change occurs from room temperature to the low temperature side or to the high temperature side, as illustrated in (AL), (A0), and (AH) in FIG. 8, the resin member 14 expands or contracts more than the metal member 12. Therefore, in the joined body 80 of the Comparative Example, a shear stress, which is a thermal stress, is concentrated at the joining interface at which the metal member 12 and the resin member 14 are joined as indicated by arrows in (BL) and (BH) in FIG. 8.

In contrast, assuming that the metal member 12 and the resin member 14 are not joined in the joined body 10 of the present embodiment, when a temperature change occurs from room temperature to the low temperature side or to the high temperature side, as illustrated in (CL), (CO), and (CH) in FIG. 8, the resin member 14 expands or contracts more than the metal member 12. However, the amount of expansion or contraction in the gradient layer 28 caused by the temperature change increases toward one side in the lamination direction Ds, and approaches the amount of expansion or contraction of the resin material alone. In contrast, the amount of expansion and contraction in the gradient layer 28 decreases toward the other side in the lamination direction Ds, and approaches the amount of expansion or contraction of the metal material alone.

As a result, in the gradient layer 28 of the joined body 10 of the present embodiment, as indicated by arrows in (DL) and (DH) in FIG. 8, although a shear stress, which is a thermal stress, is generated, the shear stress is more dispersed in the lamination direction Ds than in the joined body 80 of the Comparative Example. Therefore, compared to the joined body 80 of the Comparative Example, in the joined body 10 of the present embodiment, since the gradient layer 28 is provided, the stress concentration of the thermal stress at the joining interface between the metal member 12 and the resin member 14 is reduced. Consequently, in the present embodiment, as described above, it is possible to prevent the resin member 14 from being detached from the metal member 12 due to severe temperature changes of the joined body 10.

(1) Furthermore, according to the present embodiment, as illustrated in FIGS. 2 and 4, the porous structure of the cover section 24 is a structure in which the plurality of granules 24a are joined to each other so as to form pores. The cover section 24 includes the first layer 241, and the second layer 242, which is laminated on the first layer 241 and is provided between the first layer 241 and the intersecting-direction uneven section 181. In addition, of the plurality of granules 24a included in the cover section 24, the second layer 242 includes granules 24a having a larger particle size than that of the granules 24a constituting the first layer 241.

Therefore, in the cover section 24, the content ratio of the metal material to the resin material gradually changes so as to increase approaching the intersecting-direction uneven section 181 in the thickness direction Dt of the cover section 24. As a result, the configuration of the cover section 24 is also capable of achieving a reduction in stress concentration of the thermal stress.

(2) Moreover, according to the present embodiment, the intersecting-direction uneven section 181 is formed containing the melt solidified material in which the base metal of the metal member 12 exhibits a resolidified state with a composition of the base metal, and the cover section 24 is formed containing a metal oxide in which the base metal of the metal member 12 has been oxidized. Therefore, the evaporated metal and the molten metal generated with the formation of the grooves 16 by irradiation of the energy beam 52 can be used to form each of the cover section 24 and the intersecting-direction uneven section 181.

(3) In addition, according to the present embodiment, the base metal of the metal member 12 is aluminum alloy. Therefore, as a result of the irradiation of the energy beam 52, it is possible to form the grooves 16, form the intersecting-direction uneven section 181, form the inter-groove uneven section 182, and form the cover section 24.

(4) Also, according to the present embodiment, the resin member 14 is made of PBT. Therefore, by heating and fluidizing the resin material, the resin material can be permeated into the inside of the grooves 16, the concave parts of the intersecting-direction uneven section 181 and the inter-groove uneven section 182, and the porous structure of the cover section 24, and the metal member 12 and the resin member 14 can be firmly joined.

(5) Furthermore, according to the present embodiment, the inter-groove uneven section 182 is included in the inter-groove section 22 of the metal member 12, and forms an uneven shape. In addition, the cover section 24 extends to the inter-groove section 22 and forms the surface layer of the inter-groove section 22, covers the inter-groove uneven section 182, and is formed as a thinner layer than the uneven depth H2 of the inter-groove uneven section 182.

That is, the similar surface shape to that of the groove surface formation section 20 including the intersecting-direction uneven section 181 is formed on not only the groove surface formation section 20, but also on the inter-groove section 22 including the inter-groove uneven section 182. Therefore, compared to a case where the inter-groove section 22 does not include the inter-groove uneven section 182, the metal member 12 and the resin member 14 can be more firmly joined.

(6) Moreover, according to the present embodiment, as illustrated in FIG. 2, the joining uneven section 18 is formed such that the plurality of protruding ends 18a included in the uneven shape of the joining uneven section 18 are biased facing more toward one side than the other side in the groove arrangement direction Dw. Therefore, it is possible to join the metal member 12 and the resin member 14 so as to firmly resist an external force that tries to displace the resin member 14 relative to the metal member 12 toward the other side in the groove arrangement direction Dw. That is, it is possible to add directivity to the joining force that resists the external force, which tries to detach the resin member 14 from the metal member 12, and maintains the joining between the metal member 12 and the resin member 14.

In addition, according to the present embodiment, in third step S03 in FIG. 5, as illustrated in FIG. 2, as a result of the molten metal that has remained on the joining surface 15 without being scattered being solidified in a state where the molten metal is exhibiting an uneven shape due to the evaporation pressure, the intersecting-direction uneven section 181 is provided on the groove surface 161. Further, in third step S03, by attaching and solidifying the scattered molten metal and evaporated metal on the joining surface 15, the cover section 24 that covers the intersecting-direction uneven section 181 can be provided. At the same time, the cover section 24 is formed as a thinner layer than the uneven depth H1 of the intersecting-direction uneven section 181, and is formed having a porous structure.

Therefore, if the resin member 14 is joined to the metal member 12 manufactured by the manufacturing process in FIG. 5, the joined body 10 including the joining interface between the metal member 12 and the resin member 14 illustrated in FIG. 2 can be obtained. That is, it is possible to obtain the joined body 10 that is capable of preventing the resin member 14 from being detached from the metal member 12, even when placed in an environment with severe temperature changes.

(7) Also, according to the present embodiment, the energy beam 52 that is irradiated with respect to the processed member 50 in second step S02 in FIG. 5 is a pulse oscillation beam. Further, the energy beam 52 is irradiated with a power density of 104 to 107 W/mm² and a pulse width of 10 ps to 10 ps. As a result, as illustrated in FIGS. 2 and 4, the metal member 12, which has the joining uneven section 18 and the cover section 24 formed with the plurality of grooves 16, can be obtained by scanning the energy beam 52 a single time in each process that forms a single groove 16. This has been confirmed regardless of whether the base metal of the metal member 12 is aluminum alloy or aluminum.

For example, when the power density of the energy beam 52 is above 107 W/mm², or the pulse width is below 10 ps, the evaporation of the base metal of the metal member 12 by the irradiation of the energy beam 52 becomes excessive, and the amount of the molten metal for forming the uneven shape of the joining uneven section 18 becomes insufficient. Therefore, the uneven shape of the joining uneven section 18 becomes small. On the other hand, when the power density of the energy beam 52 is below 104 W/mm², or the pulse width is above 10 ps, the evaporation of the base metal of the metal member 12 by the irradiation of the energy beam 52 becomes insufficient, and too much molten metal is generated. Therefore, the evaporation pressure of the metal material that raises the molten metal to form the uneven shape of the joining uneven section 18 becomes insufficient, and the uneven shape becomes small. For this reason, in order to form the uneven shape of the joining uneven section 18 with an appropriate size, as described above, it is preferable that the power density of the energy beam 52 is 104 to 107 W/mm², and the pulse width is 10 ps to 10 ps.

OTHER EMBODIMENTS (1) In the first embodiment described above, the thicknesses H1 and H2 of the joining uneven section 18 illustrated in FIG. 2 are, for example, 1 to 100 μm, and the thickness of the cover section 24 is, for example, 10 nm to 10 μm, but this is only an example. More preferably, the thicknesses H1 and H2 of the joining uneven section 18 are 10 to 50 μm, and the thickness of the cover section 24 is 10 nm to 5 μm.

(2) In the first embodiment described above, the base metal of the metal member 12 illustrated in FIG. 1 is aluminum alloy, and the resin member 14 is made of PBT, but this is only an example. For example, the base metal of the metal member 12 may be aluminum, iron, iron alloy, copper, or copper alloy. Furthermore, the resin member 14 may be made of PPS, epoxy resin, POM, PC, PMMA, or PA. Note that PPS is an abbreviation for polyphenylene sulfide resin, POM is an abbreviation for polyacetal resin, PC is an abbreviation for polycarbonate resin, PMMA is an abbreviation for acrylic resin, and PA is an abbreviation for polyamide resin.

(3) In the first embodiment described above, the energy beam 52 in FIG. 6 is, for example, an infrared laser beam, but it is not necessarily limited to being an infrared laser beam. For example, the energy beam 52 may be a laser beam having a wavelength different from that of an infrared laser beam. Further, the energy beam 52 may be an electron beam instead of a laser beam.

(4) In the first embodiment described above, the pulse width of the energy beam 52 in FIG. 6 is 10 μs to 10 μs, the power density is 104 to 107 W/mm², and the irradiation diameter on the joining surface 15 is 100 μm or more, but this is only an example. More preferably, the pulse width of the energy beam 52 is 100 μs to 1 μs, the power density is 105 to 107 W/mm², and the irradiation diameter on the joining surface 15 is 100 μm to 1 mm.

(5) In the first embodiment described above, as illustrated in FIG. 4, the cover section 24 has a two-layer structure consisting of the first layer 241 and the second layer 242, but a single-layer structure or a multi-layer structure consisting of three or more layers can also be considered. For example, when the cover section 24 has a three-layer structure, the cover section 24 has, in addition to the first layer 241 and the second layer 242, a third layer having a particle size distribution of the granules 24a that is different to those of the first layer 241 and the second layer 242.

(6) In the first embodiment described above, as illustrated in FIG. 3, the plurality of grooves 16 provided in the joining surface 15 each extend in the groove extension direction Dr, but this is only an example. For example, the plurality of grooves 16 in the joining surface 15 may be a plurality of depressions that are scattered on the joining surface 15 without extending along the joining surface 15.

(7) Note that the present disclosure is not limited to the embodiments described above, and can be implemented with various modifications. Furthermore, in the embodiments described above, it is needless to say that the elements constituting the embodiments are not necessarily essential, except in a case where it is specifically stated that the elements are essential, a case where it is considered that the elements are clearly essential in principle, and the like.

Moreover, in the embodiments described above, the number of the constituent elements is not limited to a specific number except in a case where numerical values such as the number, numerical value, amount or range of the constituent elements of the embodiments are mentioned, a case where it is specifically stated that the constituent elements are essential, a case where the number of the constituent elements is clearly limited to a specific number in principle, and the like. In addition, in the embodiments described above, when referring to the materials, shapes, positional relationships, and the like of the constituent elements and the like, the materials, shapes, positional relationships, and the like are not limited, except in a case where they are specifically stated, a case where they are limited to specific materials, shapes, positional relationships, and the like in principle, and the like.

According to one aspect of the present disclosure, a joined body includes a metal member (12) having a joining surface (15) with a depression (16) formed therein, and a resin member (14) that is joined to the metal member at the joining surface, the joined body including: an intersecting-direction uneven section (181) that is included in a depressed surface formation section (20) that forms a depressed surface (161) of the metal member that faces the depression, and that is uneven in a direction intersecting a depth direction (Ds) of the depression; and a cover section (24) that forms a surface layer of the depressed surface formation section, and covers the intersecting-direction uneven section, wherein the cover section forms a thinner layer than an uneven depth (H1) of the intersecting-direction uneven section, and has a porous structure, and the porous structure of the cover section is filled with the resin member.

In this way, as a result of providing the depression formed in the joining surface of the metal member, the intersecting-direction uneven section, and the cover section, the joining interface between the metal member and the resin member becomes a structure in which the composition ratio between the material of the metal member and the material of the resin member changes gradually from the metal member side to the resin member side. Consequently, the thermal stress generated at the joining interface between the metal member and the resin member is reduced. Therefore, for example, even when the joined body is placed in an environment with severe temperature changes, such as an on-board environment, it is possible to prevent the resin member from being detached from the metal member.

Furthermore, according to another aspect of the present disclosure, a manufacturing method of a metal member (12) is a manufacturing method for a metal member having a joining surface (15) with a depression (16) formed therein, and which is joined to a resin member (14) at the joining surface, the method including: irradiating the joining surface while scanning an energy beam (52), thereby scattering a portion of a molten metal and an evaporated metal, and forming the depression (S02); and solidifying the molten metal that has remained on the joining surface without being scattered, and causing the scattered molten metal and the evaporated metal to attach and solidify on the joining surface (S03); wherein when solidifying the molten metal and the evaporated metal, by solidifying the molten metal that has remained on the joining surface without being scattered, an intersecting-direction uneven section (181) that is uneven in a direction that intersects a depth direction (Ds) of the depression is provided on a depressed surface (161) facing the depression, and when solidifying the molten metal and the evaporated metal, by further attaching and solidifying the scattered molten metal and the evaporated metal on the joining surface, a cover section (24) is provided that forms a surface layer of a depressed surface formation section (20) forming the depressed surface, and covers the intersecting-direction uneven section, and the cover section is formed as a thinner layer than an uneven depth (H1) of the intersecting-direction uneven section, and the cover section is formed having a porous structure.

In this way, a metal member used for a joined body according to the above aspect of the present disclosure can be manufactured. Therefore, when the resin member is joined to the metal member that has been manufactured as described above, it is possible to obtain a joined body that is capable of preventing the resin member from being detached from the metal member, even when placed in an environment with severe temperature changes.

Note that the reference signs in parentheses given to each of the components indicate an example of a correspondence between each of the components and specific components that are described in the embodiments.

What is claimed is:

1. A joined body including a metal member having a joining surface with a depression formed therein, and a resin member that is joined to the metal member at the joining surface, the joined body comprising:
an intersecting-direction uneven section that is included in a depressed surface formation section that forms a depressed surface of the metal member which faces the depression, and that is uneven in a direction intersecting a depth direction of the depression; and
a cover section that forms a surface layer of the depressed surface formation section, and covers the intersecting-direction uneven section, wherein
the cover section forms a thinner layer than an uneven depth of the intersecting-direction uneven section, and has a porous structure,
the porous structure of the cover section is filled with the resin member,
the porous structure of the cover section has a structure in which a plurality of granules are joined together so as to form pores,
the cover section has a first layer, and a second layer that is laminated on the first layer and is provided between the first layer and the intersecting-direction uneven section,
each of the first layer and the second layer has a structure in which a plurality of granules are stacking in a direction intersecting the joining surface, and
the second layer includes: granules having the same particle size as the granules constituting the first layer; and granules having a larger particle size than that of the granules constituting the first layer.

2. The joined body according to claim 1, wherein
the intersecting-direction uneven section is formed including a melt solidified material in which a base metal of the metal member exhibits a resolidified state with a composition of the base metal, and
the cover section is formed including a metal oxide in which a base metal of the metal member has been oxidized.

3. The joined body according to claim 1, wherein
a base metal of the metal member is aluminum, aluminum alloy, iron, iron alloy, copper, or copper alloy.

4. The joined body according to claim 1, wherein
the resin member is made of polybutylene terephthalate resin, polyphenylene sulfide resin, epoxy resin, polyacetal resin, polycarbonate resin, acrylic resin, or polyamide resin.

5. The joined body according to claim 1, further comprising an inter-depression uneven section, wherein
a plurality of depressions are formed,
the inter-depression uneven section is included in an inter-depression section that forms the joining surface between each of the plurality of depressions of the metal member, and forms an uneven shape, and
the cover section extends to the inter-depression section and also forms a surface layer of the inter-depression section, covers the inter-depression uneven section, and forms a thinner layer than an uneven depth of the inter-depression uneven section.

6. The joined body according to claim 1, further comprising a joining uneven section that forms a portion of the metal member and is provided on the joining surface, and includes the intersecting-direction uneven section, wherein
a plurality of depressions are formed, and the plurality of depressions are provided side by side from one side to an other side in an one direction,
the joining uneven section is covered by the cover section, and forms an uneven shape that extends between each of the plurality of depressions and to the depressed surface, and
the joining uneven section is formed such that a plurality of protruding ends included in an uneven shape of the joining uneven section are biased facing more toward the one side than the other side in the one direction.

7. A manufacturing method of a metal member having a joining surface with a depression formed therein, and which is joined to a resin member at the joining surface, the method comprising:
irradiating the joining surface while scanning an energy beam, thereby scattering a portion of a molten metal and an evaporated metal, and forming the depression; and
solidifying the molten metal that has remained on the joining surface without being scattered, and causing the scattered molten metal and the evaporated metal to attach and solidify on the joining surface, wherein
when solidifying the molten metal and the evaporated metal, by solidifying the molten metal that has remained on the joining surface without being scattered, an intersecting-direction uneven section that is uneven in a direction that intersects a depth direction of the depression is provided on a depressed surface facing the depression, and
when solidifying the molten metal and the evaporated metal, by further attaching and solidifying the scattered molten metal and the evaporated metal on the joining surface, a cover section is provided that forms a surface layer of a depressed surface formation section forming the depressed surface, and covers the intersecting-direction uneven section, and the cover section is formed as a thinner layer than an uneven depth of the intersecting-direction uneven section, and the cover section is formed having a porous structure such that:
the porous structure of the cover section has a structure in which a plurality of granules are joined together so as to form pores; the cover section has a first layer, and a second layer that is laminated on the first layer and is provided between the first layer and the intersecting-direction uneven section; each of the first layer and the second layer has a structure in which a plurality of granules are stacked in a direction intersecting the joining surface; and the second layer includes: granules having the same particle size as the granules constituting the first layer; and granules having a larger particle size than that of the granules constituting the first layer.

8. The manufacturing method of a metal member according to claim 7, wherein the energy beam is a pulse oscillation beam, and when forming the depression, the energy beam is irradiated with a power density of $10^4$ to $10^7$ W/mm$^2$, and a pulse width of 10 ps to 10 μs.

\* \* \* \* \*